(12) United States Patent
Mothfar (10) Patent No.: US 9,718,428 B1
(45) Date of Patent: Aug. 1, 2017

(54) ROLLOVER PREVENTION SYSTEM (71) Applicant: Ahmed Younis Mothfar, Safat (KW)

(72) Inventor: Ahmed Younis Mothfar, Safat (KW)

( * ) Notice: Subject to any disclaimer, the term of this patent is extended or adjusted under 35 U.S.C. 154(b) by 0 days.

(21) Appl. No.: 15/480,303

(22) Filed: Apr. 5, 2017

(51) Int. Cl.
*B60R 21/13* (2006.01)
*B62K 25/04* (2006.01)
*F16H 19/00* (2006.01)
B60R 21/00 (2006.01)
B62K 5/05 (2013.01)

(52) U.S. Cl.
CPC .............. *B60R 21/13* (2013.01); *B62K 25/04* (2013.01); *F16H 19/001* (2013.01); *B60R 2021/0018* (2013.01); *B62K 5/05* (2013.01)

(58) Field of Classification Search
CPC ........ B60G 2800/9122; B60G 17/0162; B60G 17/016; B60G 21/04
USPC .................................... 280/124.106, 124.107
See application file for complete search history.

(56) References Cited

U.S. PATENT DOCUMENTS

| 1,903,966 | A | | 4/1933 | Granges | |
|---|---|---|---|---|---|
| 4,103,920 | A | * | 8/1978 | Smith ................ | B60G 17/0152 105/164 |
| 6,250,649 | B1 | | 6/2001 | Braun | |
| 7,591,337 | B2 | | 9/2009 | Suhre et al. | |
| 7,802,800 | B2 | | 9/2010 | Melcher | |
| 8,317,207 | B2 | * | 11/2012 | Mercier ............... | B60G 21/007 180/210 |
| 8,839,898 | B2 | | 9/2014 | Mimura et al. | |
| 8,899,601 | B1 | | 12/2014 | Mothfar | |
| 2004/0232632 | A1 | * | 11/2004 | Beck .................... | B60G 17/016 280/5.5 |
| 2005/0167174 | A1 | * | 8/2005 | Marcacci ........... | B60G 17/0152 180/76 |
| 2007/0010919 | A1 | | 1/2007 | Ammon | |
| 2009/0057048 | A1 | * | 3/2009 | Chien ................ | B60G 17/0162 180/282 |
| 2016/0201781 | A1 | * | 7/2016 | Cao ....................... | F16K 31/528 251/248 |

FOREIGN PATENT DOCUMENTS

| DE | 28 55 105 A1 | 7/1980 |
|---|---|---|
| DE | 28 56 236 A1 | 7/1980 |
| RU | 2 115 581 C1 | 7/1998 |

* cited by examiner

*Primary Examiner* — James A English
(74) *Attorney, Agent, or Firm* — Richard C. Litman (57) ABSTRACT

The rollover prevention system includes a motor having a drive shaft, a gear assembly positioned in communicating relation with the motor, an assembly box for housing the gear assembly, and an electronic control system for controlling the rollover prevention system. The gear assembly includes a drive gear positioned in communicating relation with a reduction gear, the reduction gear positioned on the drive shaft of the motor, a drive pin attached to the drive shaft of the motor, the drive pin having a gear, as well as a rotatable wheel positioned in communicating relation with the gear positioned on the drive pin, and an eccentric disc positioned within the rotatable wheel. The rotatable wheel includes an attachment member positioned on the exterior surface of the rotatable wheel, the attachment member being attached to a driver's seat of a vehicle.

20 Claims, 9 Drawing Sheets

Position A
FIG. 4A

Position B
FIG. 4B

Position B-C
FIG. 4C

Position C
FIG. 4D

FIG. 5

ROLLOVER PREVENTION SYSTEM

BACKGROUND OF THE INVENTION

1. Field of the Invention

The present invention relates generally to vehicle dynamics, and more particularly to an independent suspension system for a vehicle.

2. Description of the Related Art

Most motor vehicles, including quad-bikes and trike/reverse-trike motor bikes, fail to provide adequate stability while the vehicle is turning and being driven at high speeds. Vehicle rollover resulting from such maneuvers is not uncommon. Accordingly, there is a need for a rollover prevention system that provides the driver more stability and control at high speeds, while keeping the driver in close proximity to the vehicle.

Thus, a rollover prevention system solving the aforementioned problems is desired.

SUMMARY OF THE INVENTION

The rollover prevention system includes a motor having a drive shaft, a gear assembly positioned in communicating relation with the motor, an assembly box for housing the gear assembly, and an electronic control system for controlling the motor of the rollover prevention system. The gear assembly includes a drive gear positioned in communicating relation with a reduction gear, the reduction gear positioned on the drive shaft of the motor, a drive pin attached to the drive shaft of the motor, the drive pin having a gear, as well as a rotatable wheel positioned in communicating relation with the gear positioned on the drive pin, and an eccentric disc positioned within the rotatable wheel. The rotatable wheel includes an attachment member positioned on the exterior surface of the rotatable wheel, the attachment member being attached to a driver's seat of a vehicle. The system can include a solenoid and a damper for increasing stability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1A-5, a rollover prevention system 100 configured for providing stability and control for a driver of a vehicle V, such as an on-road or off road vehicle, a wheelchair, or other wheeled transporting system, when making a turn and for preventing the vehicle V from rolling over during the turn, is generally illustrated. The system 100 can be manufactured as a permanent fixture in a vehicle or as a separate vehicle part configured for installation in a vehicle by a user.

Figure 1A:
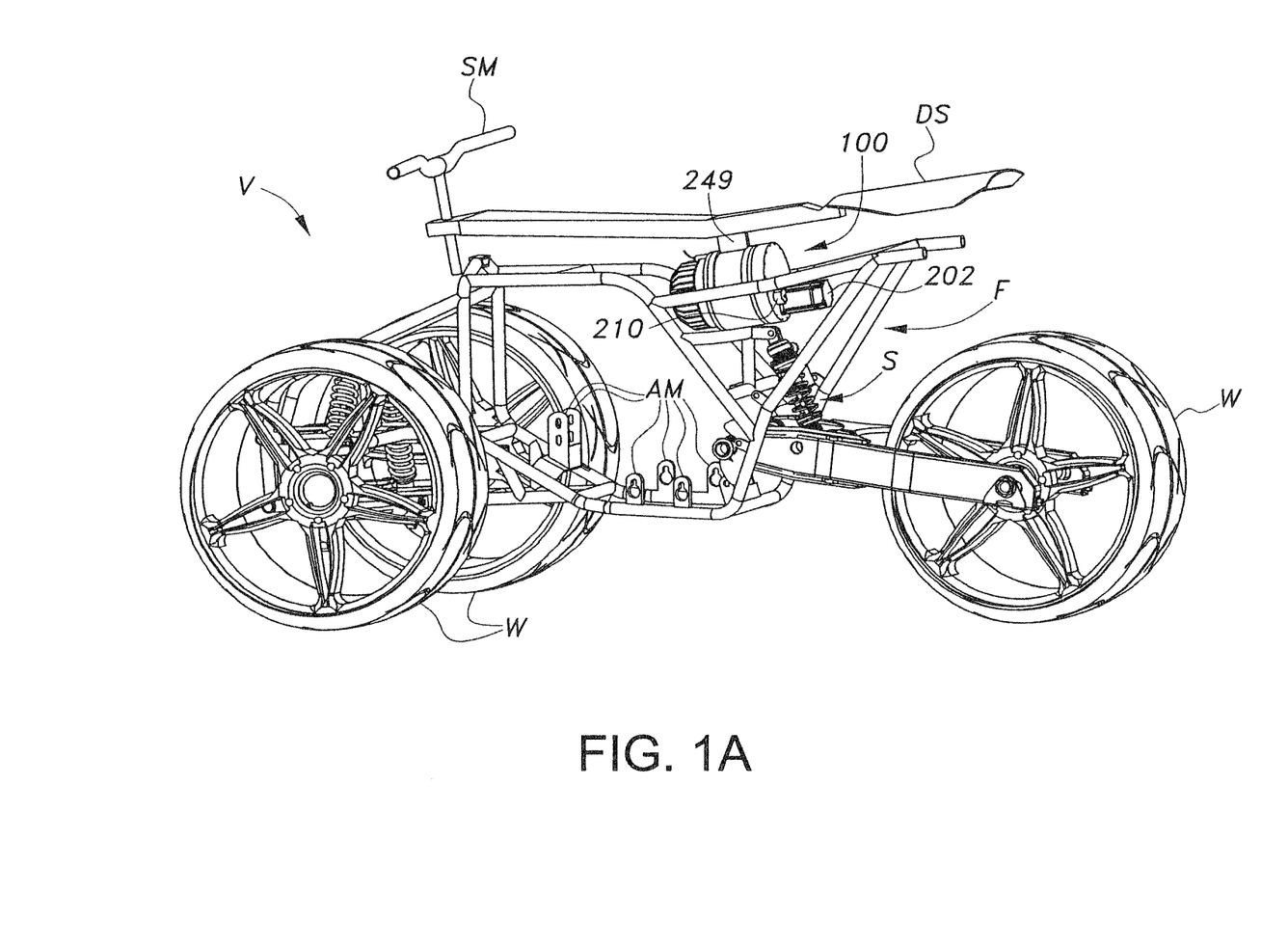
FIG. 1A is an environmental, perspective view illustrating a rollover prevention system, according to the present invention, positioned in communicating relation with a driver's seat and the steering controls of a vehicle.
Figure 1B:
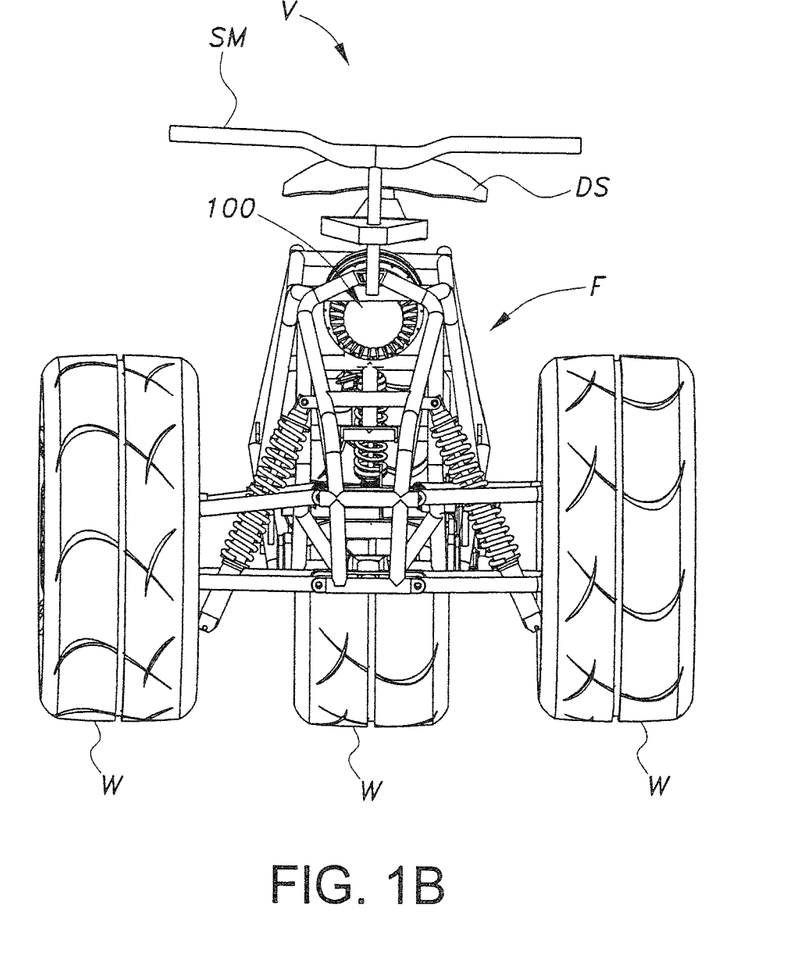
FIG. 1B is an environmental, front view of a vehicle including the rollover prevention system, according to the present invention.
Figure 1C:
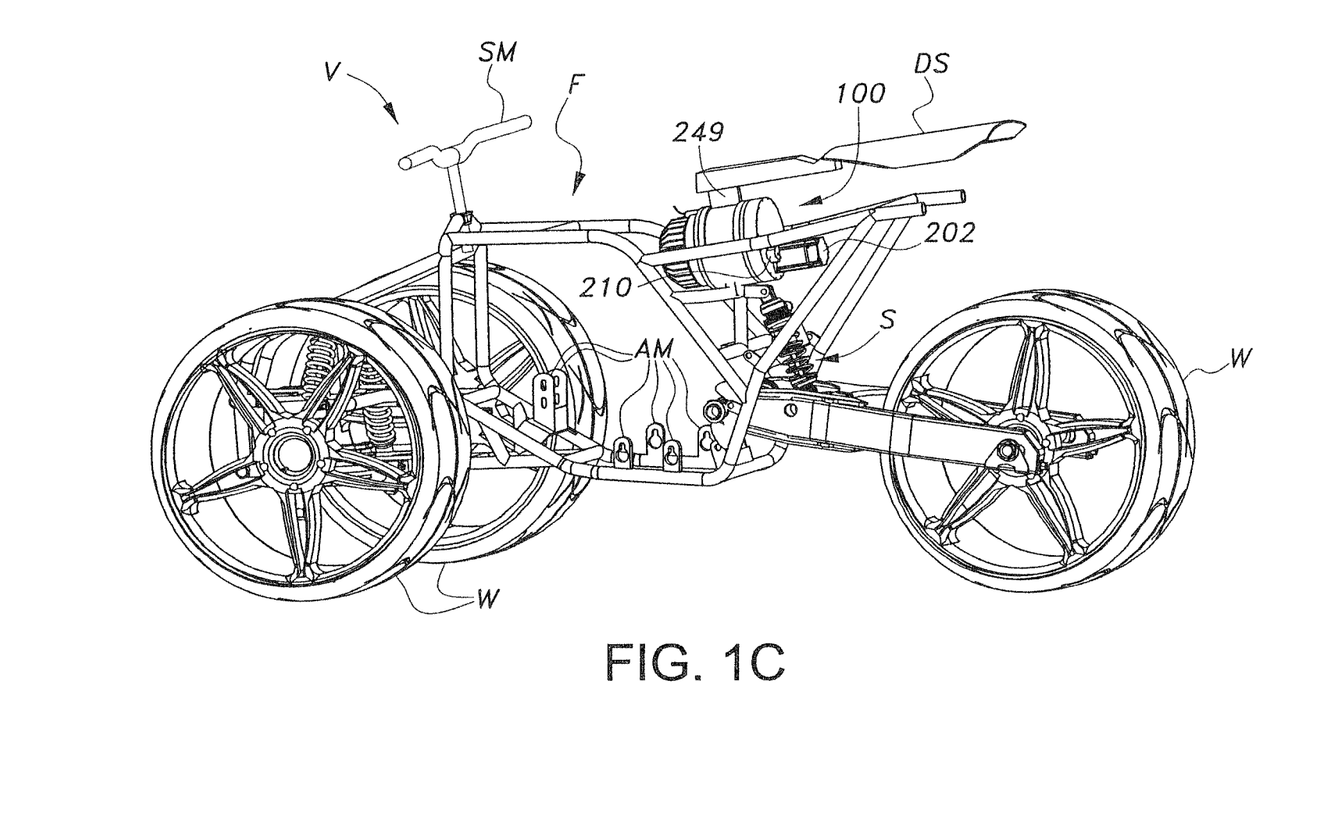
FIG. 1C is an environmental, side perspective view illustrating the rollover prevention system, according to the present invention, positioned in communicating relation with the driver's seat.

The vehicle V can be a trike or a reverse-trike bike, such as a motorized or a non-motorized trike, or any other type of vehicle known in the art, having a driver's seat DS and a steering mechanism SM, such as handle bars. The rollover prevention system 100 can be positioned beneath the driver's seat DS, as illustrated in FIGS. 1A-1C. For example, the rollover prevention system 100 can be positioned in communicating relation with both the driver's seat DS and the steering mechanism SM (FIG. 1A), or positioned in communicating relation with only the driver's seat DS (FIG. 1C). When the rollover prevention system 100 is positioned in communicating relation with both the driver's seat DS and the steering mechanism SM (FIG. 1A) both the driver's seat DS and the steering mechanism SM can tilt uniformly in the same direction (e.g. from one side to the other in response to a turn), such as to the right or to the left. If, on the other hand, the rollover prevention system 100 is positioned in communicating relation with the driver's seat DS only (FIG. 1C) the driver's seat DS can tilt from one side to the other independently of the steering mechanism SM. Regardless, since the rollover prevention system 100 operates independently from the vehicle's V suspension system, the rollover prevention system 100 can provide additional stability and control to the driver of the vehicle V while making a turn.

The vehicle V can be powered by an engine (not shown) as described in U.S. Pat. No. 8,899,601 B1 that is hereby incorporated by reference in its entirety. Although not shown, the vehicle V can include pedals. According to an embodiment, the main frame F of the vehicle V can include one or more attachment members AM configured for securing the engine to the frame F of the vehicle V, as is conventionally known. Additionally, the vehicle V can optionally include a suspension member S, such as a shock absorber, positioned beneath the rollover prevention system 100.

The rollover prevention system 100 includes a motor 202, such as a high-speed servo or stepper motor, having a drive shaft 205, a gear assembly 200 positioned in communicating relation with the motor 202, an assembly box 300 for housing the gear assembly 200, and an electronic control system 500 having a plurality of sensors 510-530 for monitoring and controlling the movement of the driver's seat DS.

Figure 4A:
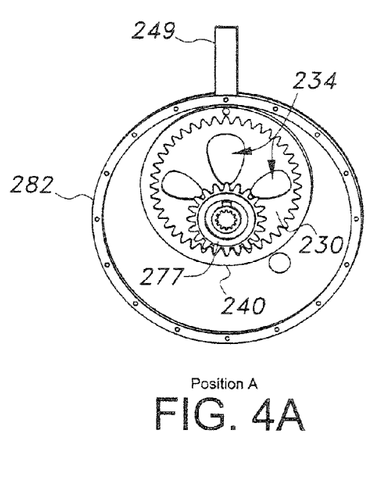
FIG. 4A illustrates the position of an attachment member of the rollover prevention system, according to the present invention, when the driver's seat is in an up-right vertical position.

The gear assembly 200 includes a drive gear 222 and a reduction gear 224 positioned in direct communication with the drive gear 222. The reduction gear 224 is positioned on the drive shaft 205 of the motor 202. The motor 202 drives rotation of the reduction gear 224, and the reduction gear 224, in turn, rotates the drive gear 222. The motor 202 can be powered by any suitable type of power source, such as a battery. The gear assembly 200 further includes a damper 210 having a shaft 215, an eccentric disc 230 moveably positioned within a rotatable wheel 240, a solenoid 255 having a retractable pin 257 (configured for selectively locking the rollover prevention system 100 in an up-right, vertical position as illustrated in FIG. 4A), and a chain gear system 295 positioned in communicating relation with a spiral spring system 298. The spiral spring system 298 is configured for controlling movement of the driver's seat DS in case of motor 202 failure. The shaft 215 of the damper 210 is positioned in direct communication with the drive gear 222 of the gear assembly 200 to control the torque, as well as maintain the driver's seat DS in the correct position during a turn. The damper 210 can be electronically controlled and can be used in place of an electronically controlled hydraulic shock absorber.

The assembly box 300 of the system 100 includes a reduction gear case 250 for housing the drive gear 222 and the reduction gear 224, an eccentric case 282 for housing the eccentric disc 230 and the rotatable wheel 240, an outer disc 290, and an outer cover member 299. The reduction gear case 250 can be positioned on one side of the eccentric case and the outer disc 290 can be positioned on another side of the eccentric case 282. The outer cover member 299 can be positioned on the side of the outer disc 290 opposing the eccentric case 282. Fasteners 310, such as screw bolts or any other suitable type of fastener, can secure the assembly box 300 so as to protect the gear assembly 200. A protective plate 278 may be slidably secured to the eccentric case 282 to provide further protection for the eccentric disc 230 and the rotatable wheel 240, as further discussed below.

Figure 2A:
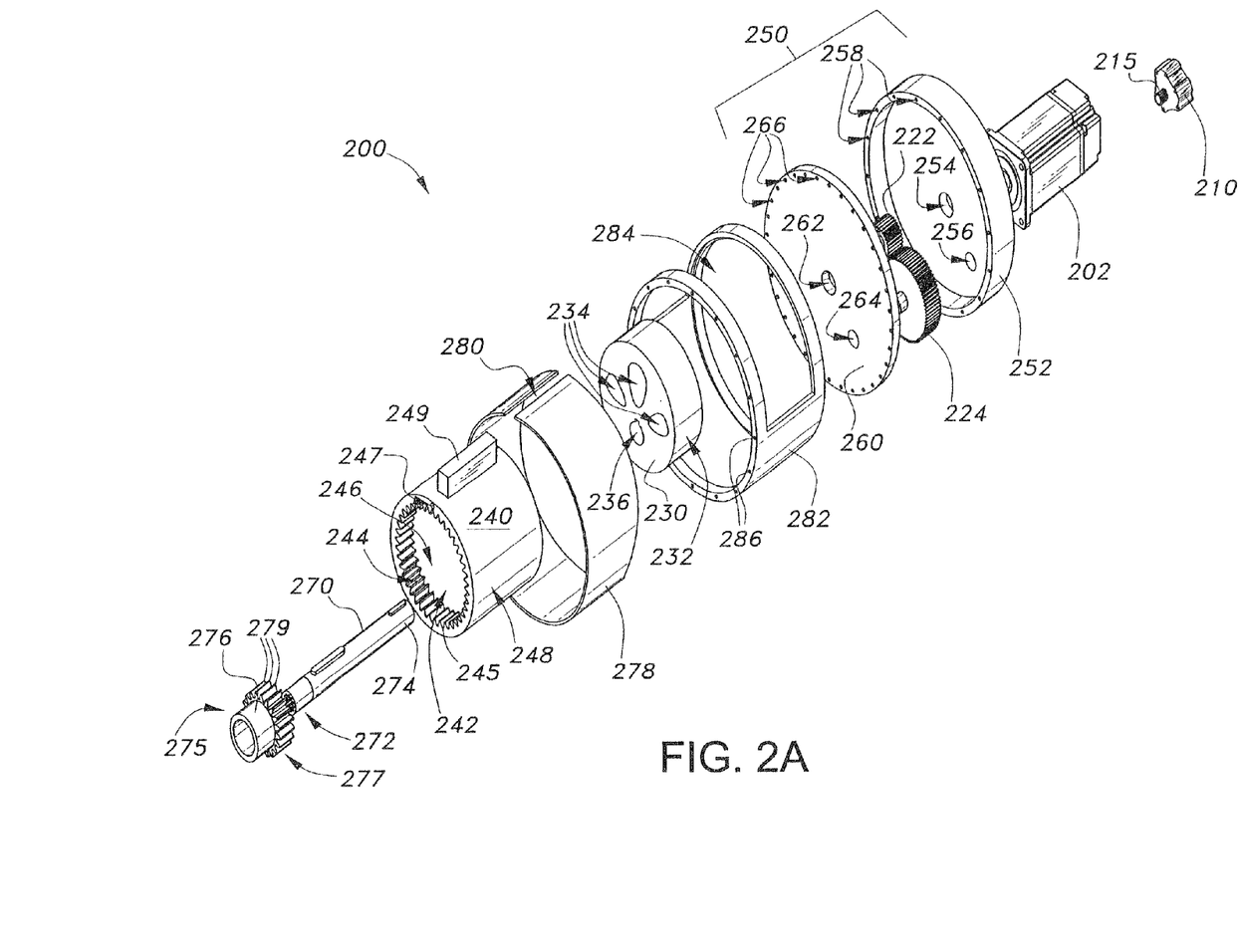
FIG. 2A is a partial exploded view of a gear assembly used in conjunction with the rollover prevention system, according to the present invention.
Figure 2B:
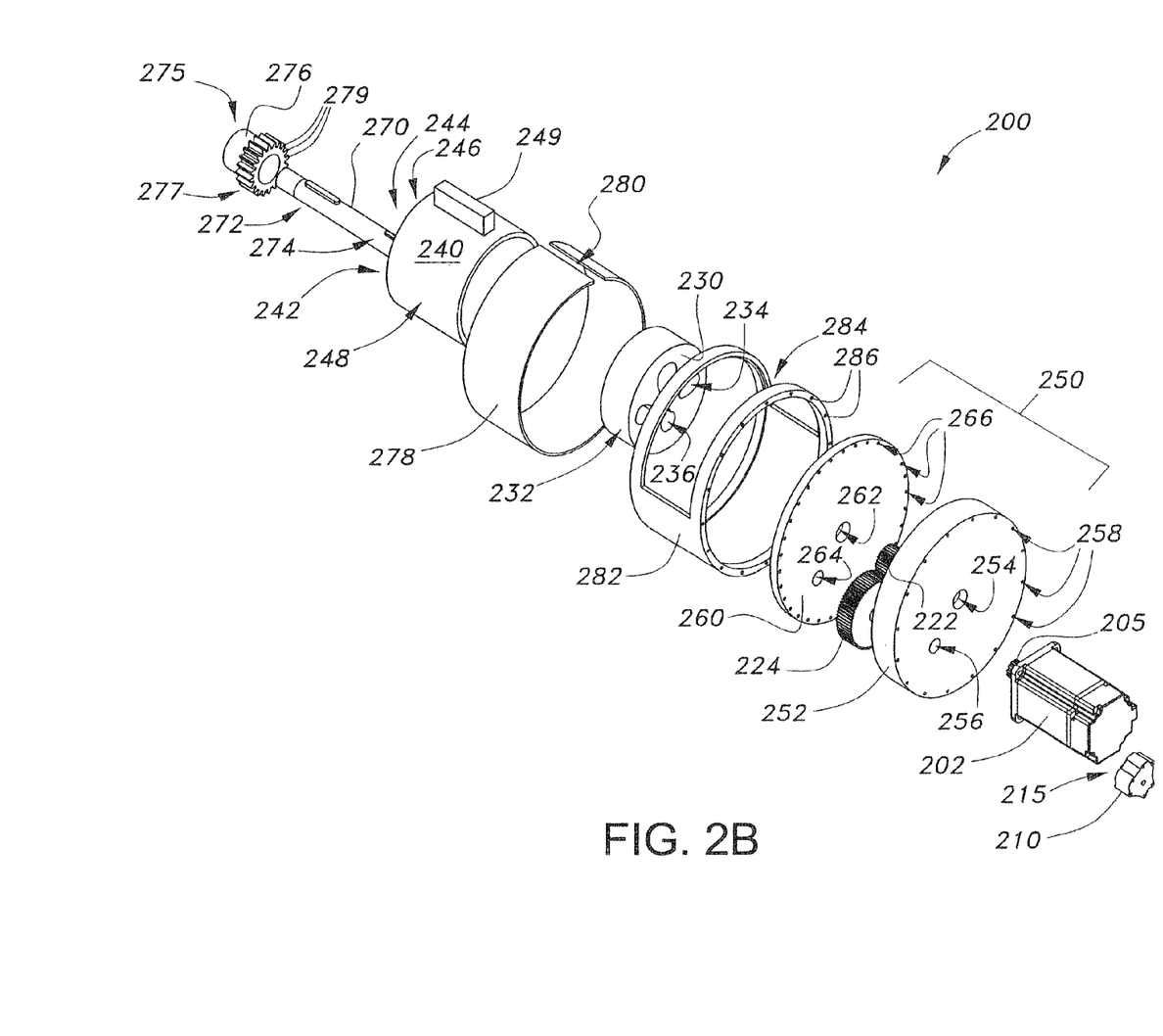
FIG. 2B is another partial exploded view of the gear assembly of the rollover prevention system, according to the present invention.
Figure 2C:
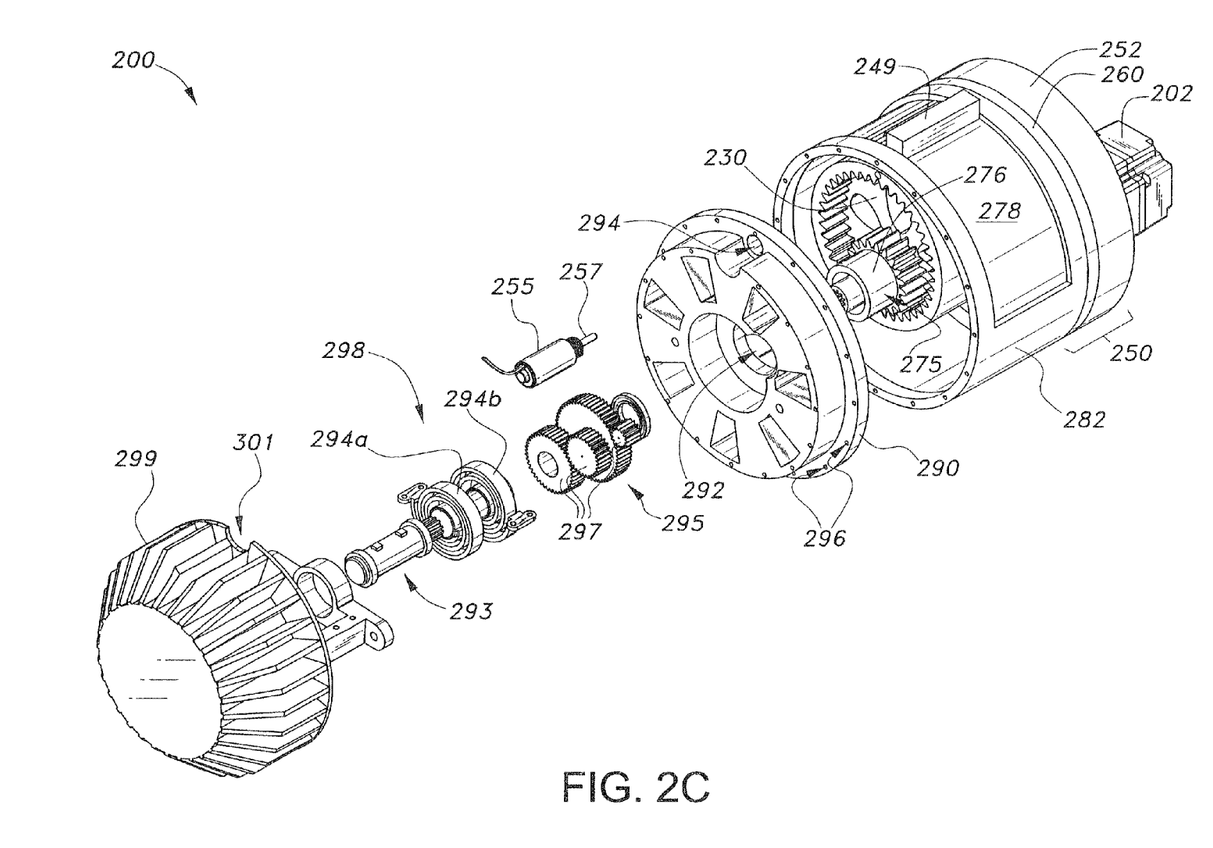
FIG. 2C is another partial exploded view of the gear assembly of the rollover prevention system, according to the present invention.

As illustrated in FIGS. 2A-2C, the reduction gear case 250 can shield and protect the drive gear 222 and the reduction gear 224. The reduction gear case 250 includes a first disc 252 and a second disc 260. The first disc 252 and the second disc 260 can be formed from any suitable material, such as metal. The first disc 252 includes a centrally positioned primary opening 254 configured for receiving the drive shaft 205 of the motor 202, a secondary opening 256 configured for receiving the shaft 215 of the damper 210, and a plurality of tertiary openings 258 radially positioned along the perimeter of the first disc 252, each tertiary opening 258 configured to receive a fastener, such as fastener 310. Similarly, the second disc 260 includes a centrally positioned primary opening 262 configured for receiving the drive shaft 205 of the motor 202, a secondary opening 264 configured for receiving the shaft 215 of the damper 210, and a plurality of tertiary openings 266 radially positioned along the perimeter of the second disc 260, each tertiary opening 266 configured for receiving a fastener, such as fastener 310. For example, once each primary opening 254,262, each secondary opening 256,264 and each tertiary opening 258,266 are aligned, the fastener 310 can be threaded through the tertiary openings 258, 266 so as to secure the first disc 252 and the second disc 260 together, and thereby form the reduction gear case 250.

The eccentric disc 230 includes a machine side 232 (e.g. a smooth side), a plurality of apertures 234 configured for lowering the mass of the eccentric disc 230, and an opening 236, such as a groove, configured for receiving a drive pin 270. The drive pin 270 includes a front end 272 having a gear 275 and an opposing rear end 274. The gear 275 includes a smooth portion 276 and a geared portion 277 having a plurality of teeth 279.

The rear end 274 of the drive pin 270 is inserted through the opening 236 of the eccentric disc 230, as well as through the centrally positioned primary opening 262 of the second disc 260 of the reduction gear case 250 such that the rear end 274 of the drive pin 270 can be attached to the drive shaft 205 of the motor 202.

The rotatable wheel 240 can be formed from any suitable lightweight durable material, such as steel. The rotatable wheel 240 includes an interior surface 242 having a gear path 244 with a plurality of teeth 245 and a guide path 246 (e.g. a smooth path), an exterior surface 248, an attachment member 249 extending from the exterior surface 248 of the rotatable wheel 240, (FIGS. 2A and 2B), and an opening 247, such as a pin hole, configured for receiving the retractable pin 257 of the solenoid 255. The guide path 246 of the rotatable wheel 240 is configured for receiving the machine side 232 of the eccentric disc 230 so that there is a smooth fit once the eccentric disc 130 is positioned within the guide path 246 of the rotatable wheel 240. Once the eccentric disc 230 is positioned within the rotatable wheel 240, the rear end 274 of the drive pin 270 is threaded through the opening 236 of the eccentric disc 230 such that the drive pin 270 can attach to the drive shaft 205 of the motor 202, as described above. The gear 275 is inserted onto the drive pin 270 such that each of the plurality of teeth 279 of the geared portion 277 of the gear 275 is positioned in an interlocking position within the gear path 244 of the rotatable wheel 240.

When a vehicle makes a turn, the electronic control system can initiate rotation movement since the rollover prevention system 100 is in a holding position once the vehicle V starts. Accordingly, the motor 202 begins to rotate the drive shaft 205, which, in turn, causes the drive pin 270, as well as the gear 275 positioned on the front end 272 of the drive pin 270, to rotate. The rotation of the geared portion 277 of the gear 275, such as to the right or to the left, may then rotate the eccentric disc 230 within the rotatable wheel 240, as well as rotate the rotatable wheel 240 about the eccentric disc 230 in a given direction, such as in a clockwise or counter-clockwise direction. Movement of the rotatable wheel 240 about the eccentric disc 230 moves the attachment member 249 of the rotatable wheel 240. For example, the movement of the rotatable wheel 240 about the eccentric disc 230 can allow the driver's seat DS to tilt up to about 90° to the right or up to about 90° to the left depending on the direction of the turn, as well as the sharpness of the turn. The attachment member 249 can similarly tilt left during a left hand turn. Since the driver's seat DS of the vehicle V is mounted onto the attachment member 249 of the rotatable wheel 240, rotating the gear 275 and, in turn, the rotatable wheel 240 to the right or to the left, for example, may tilt the driver's seat DS in a corresponding direction, such as to the right or to the left, depending on the turn. The electronic control system 500 can be configured to determine the degree and direction of the tilt, e.g., against the direction of the turn or in the direction of the turn.

The solenoid 255 is configured for stabilizing (e.g. locking) the position of the driver's seat DS in an up-right, vertical position in situations where the vehicle V is standing still, in situations of motor 202 failure, and/or in situations of bumpy road conditions. It is to be noted that upon activation of the solenoid 255, the electronic control system 500 can indicate a malfunction light 555, as further discussed herein. For example, when the vehicle V is at rest and the driver is in an up-right, vertical position, the driver's seat DS will be locked in a vertical position by the extension of the retractable pin 257 of the solenoid 255 into the opening 247 of the rotatable wheel 240. Subsequently, when the vehicle V is put in motion, the retractable pin 257 of the solenoid 255 can be retracted back into the solenoid 255 to allow the driver's seat DS to tilt freely, such as tilt to the right or to the left, depending on the turn. Both the damper 210 and the solenoid 255 are controlled by the control system 500, as further discussed herein.

Figure 4B:
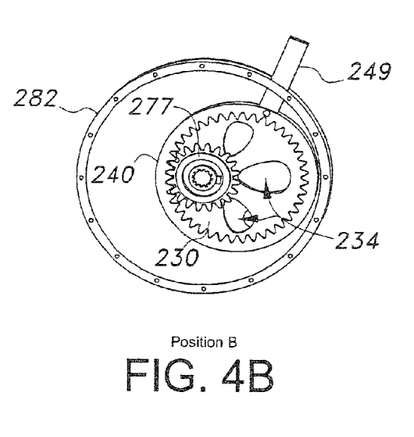
FIG. 4B illustrates the position of the attachment member of the rollover prevention system, according to the present invention, as the driver begins to turn right.
Figure 4C:
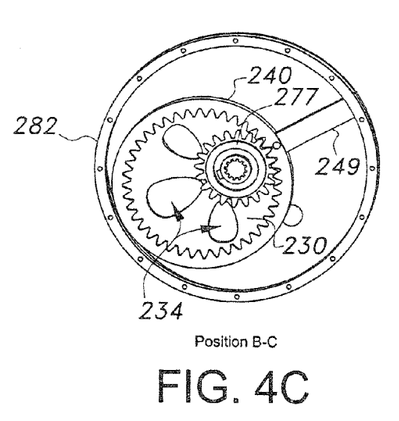
FIG. 4C illustrates the position of the attachment member of the rollover prevention system, according to the present invention, as the driver continues to turn right.
Figure 4D:
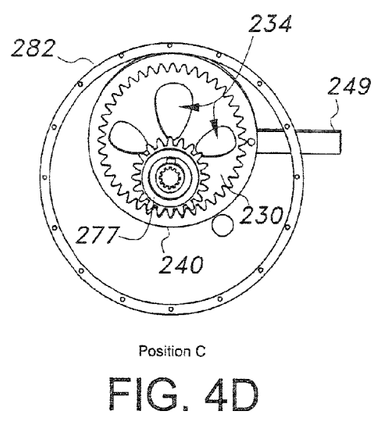
FIG. 4D illustrates the position of the attachment member of the rollover prevention system, according to the present invention, when the driver makes a hard turn to the right.

The eccentric disc 230 may rotate at a faster speed than the rotatable wheel 240 so as to give the appearance of a cube circle similar to that found in commonly known rotary engines and to allow the driver's seat DS to move from one side to the other in a more controlled and stable manner so as to prevent, such as substantially prevent, the driver of the vehicle V, or any objects attached to the vehicle V, from rolling over during a hard turn to the right or to the left. The path in which the attachment member 249 and the corresponding driver's seat DS can tilt to the right is illustrated by FIGS. 4A-4D. Specifically, FIG. 4A illustrates the position of the attachment member 249 when the vehicle V is not in motion. FIG. 4B illustrates the position of the attachment member 249 when the vehicle V is beginning a turn to the right. FIG. 4C illustrates the position of the attachment member 249 when the vehicle V is moving through the right turn. FIG. 4D illustrates the position of the attachment member 249 when the driver of the vehicle V makes a hard right hand turn. By tilting the driver's seat DS independently from the vehicle's V suspension mechanism, each wheel W of the vehicle V can remain on the surface of the road so as to provide more control and stability to the driver through the turn. The electronic control system 500 can be configured to initiate the motor at any point during the turn to rotate the drive shaft 205 of the motor 202 and, in turn, the gear 275 in the opposite direction of the turn, to counter the force of the turn and or to return the attachment member 249 and the driver's seat DS to its original up-right, vertical position. The electronic control system 500 is configured to determine the degree and direction of the tilt of the driver's seat, e.g., against the direction of the turn and/or with the direction of the turn.

The plate 278 of the assembly box 300 moveably positioned within the eccentric case 282 includes an opening 280 through which the attachment member 249 of the rotatable wheel 240 extends. The eccentric case 282 includes a semi-circle shaped opening 284 positioned on the upper half of the eccentric case 282. The opening 284 can be dimensioned to limit the movement of the rotatable wheel 240. For example, a size of the opening 248 can be only large enough to permit the rotatable wheel 240 to rotate up to approximately 90° to the right or up to approximately 90° to the left. The eccentric case 282 includes a plurality of openings 286 configured for receiving fasteners 310 adapted for securing the eccentric case 282 to the second disc 260 of the reduction gear case 250.

The eccentric disc 230 is moveably positioned within the rotatable wheel 240 and the rotatable wheel 240 is positioned within the plate 278 such that the attachment member 249 of the rotatable wheel 240 extends through the opening 280 of the plate 278. The plate 278 is moveably positioned within the eccentric case 282 secured to the second plate 260 of the reduction gear case 250. The outer disc 290 is secured to the other side of the eccentric disc 282 so as to prevent, such as substantially prevent, any debris from entering into the rotatable wheel 240. The outer disc 290 includes a centrally positioned primary opening 292 configured for receiving the smooth portion 276 of the gear 275, as well as the front end 272 of the drive pin 270, a secondary opening 294 configured for receiving the solenoid 255, and a plurality of tertiary openings 296 configured for receiving fastener 310 for securing the outer disc 290 to the eccentric disc 282, as illustrated in FIG. 3.

The chain gear assembly 295 includes a plurality of gears 297, each of the plurality of gears 297 being positioned in communicating relation with the gear 275 on the front end 272 of the drive pin 270 to control the speed of the rotatable wheel 240. Each of the plurality of gears 297 of the chain gear assembly 295 can be arranged in a ratio of 4:3 or any other suitable configuration (e.g. ratio) according to the characteristics of the vehicle V so as to control the speed of the rotatable wheel 240.

The spiral spring system 298 is connected to the chain gear assembly 295 and is configured for providing a fail-safe counter force to the movement of the attachment member 249 to return the driver's seat DS to an up-right, vertical position in case of motor 202 failure. The spiral spring mechanism 298 includes a plurality of springs, such as a first spring 294a and a second spring 294b. The springs may be configured to be tightened or compressed initially during the vehicle turn, and then released e.g., once the driver's seat is tilted to a pre-determined angle from the upright position, should the motor 202 stop working or fail to bring the driver's seat DS to an up-right, vertical position after completing a turn. For example, the first spring 294a and the second spring 294b can be coiled in opposite directions to limit the degree of the tilt of the driver's seat DS and provide stability when the driver's seat DS is in the upright position. The spiral spring system 298, as well as each of the plurality of gears 297 of the chain gear assembly 295 is positioned on a shaft 293 that is fixedly attached to the first end 272 of the drive pin 270.

Figure 3:
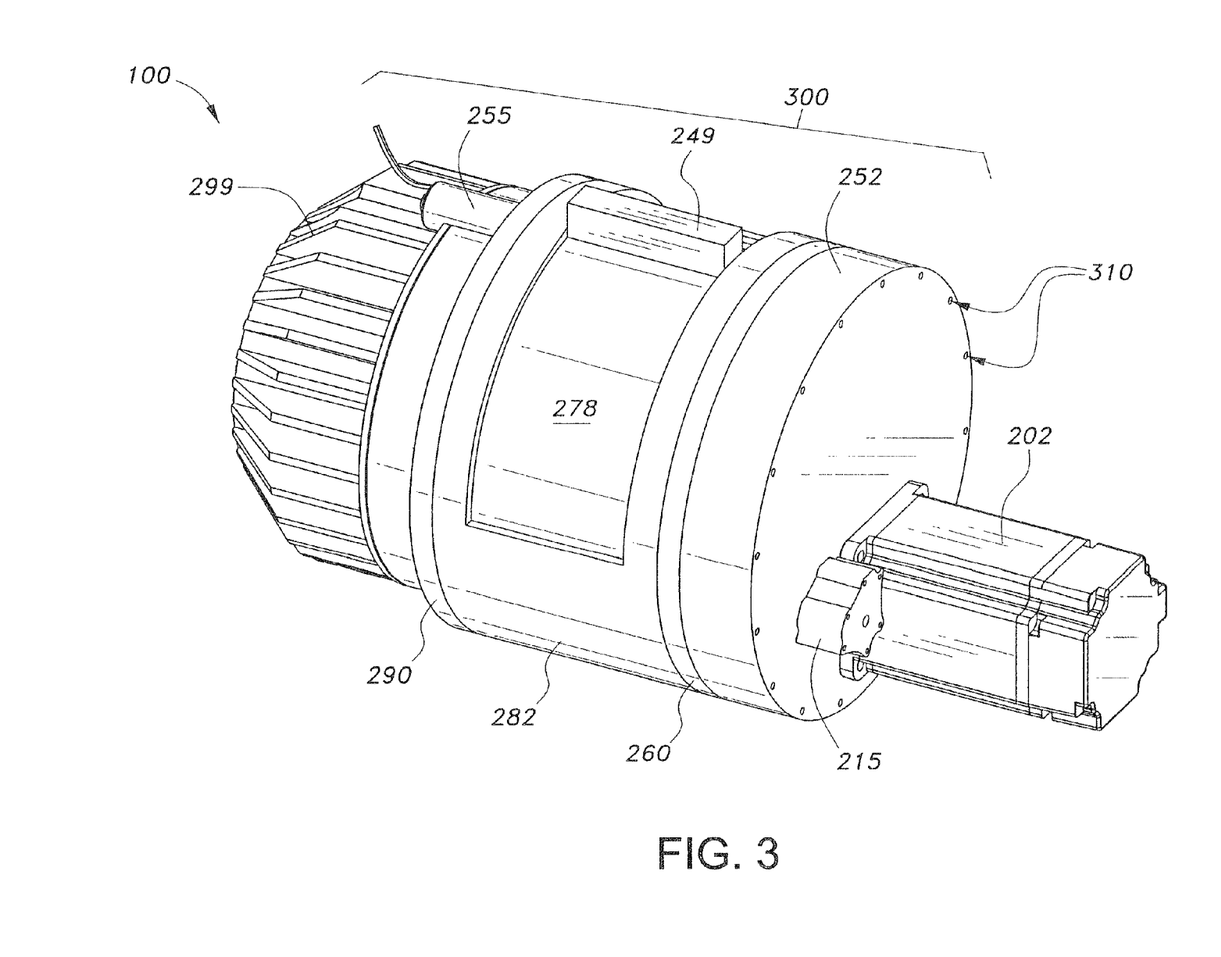
FIG. 3 illustrated an assembly box of the rollover prevention system, according to the present invention.

As illustrated in FIG. 3, the outer cover member 299 has an opening 301 suitable for receiving the solenoid 255. The outer cover member 299 is secured to the outer disc 290 so as to prevent, such as substantially prevent, any debris or foreign matter from entering into the chain gear assembly 295 and/or the spiral spring assembly 298. The outer cover member 299 can also be used to prevent, such as substantially prevent any lubricant used for the chain gear assembly 295 and/or the spiral spring assembly 298 from leaking out of the system 100. It is to be understood that gaskets (not shown) can be positioned in between the first disc 252 and the second disc 260 of the reduction gear case 250, as well as between the eccentric case 282 and the second disc 260 of the reduction gear case 250, between the eccentric case 280 and the outer disc 290, and between the outer disc 290 and the outer cover member 299 to further prevent, such as substantially prevent, any debris from coming in contact with the gear assembly 200.

Figure 5:
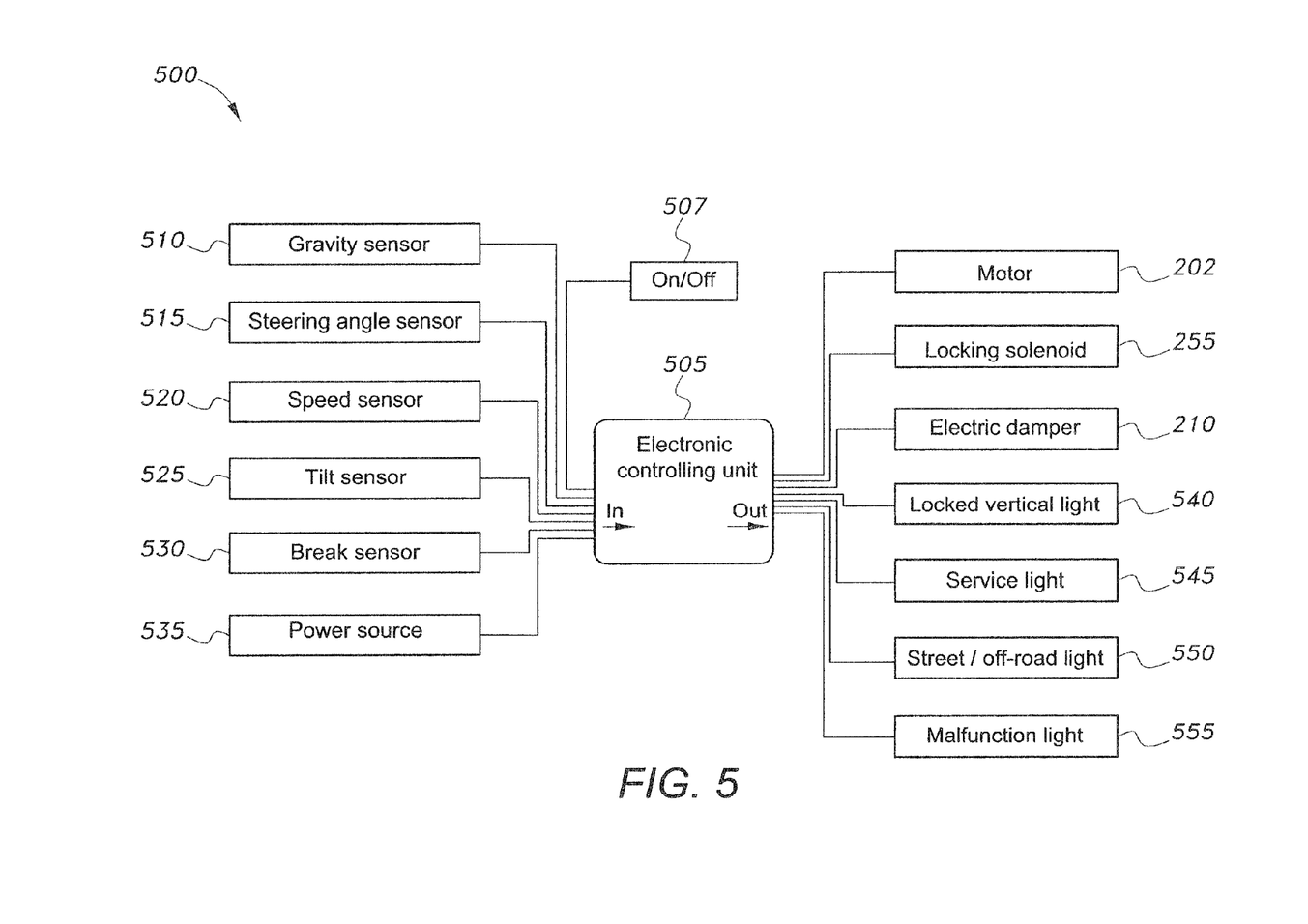
FIG. 5 is a diagram of an electronic control system for use in conjunction with the roll over prevention system, according to the present invention.

Referring to FIG. 5, the electronic control system 500 can control the motor 202, as well as the electronically controlled electric damper 210 and the solenoid 255 so as to control the range and degree of tilt of the driver' seat DS. For example, in case of motor 202 failure, the electronic control system 500 receives inputs from various sensors, further discussed below, to determine the angle of the driver's seat DS and the angle in which to tilt the driver's seat DS so as to return the driver's seat DS to an up-right, vertical position. Once the inputs are received by the electronic control system 500, the electronic control system 500 communicates with the electronically controlled electric damper 210 and the solenoid 255 so as to lock the driver's seat DS in an up-right, vertical position until the rollover prevention system 100 can be repaired. The electronic control system 500 can be positioned on the frame F of the vehicle V, such as in a location nearest to the driver's center of gravity so as to better measure the forces that the driver of the vehicle V is experiencing.

The electronic control system 500 includes an electronic control unit (ECU) 505 having an on/off button 507 configured for activating/deactivating the ECU 505. The ECU 505 is configured to add a faster response time to the rollover prevention system 100 so that the driver can have better control the vehicle V throughout hard turns and dangerous road conditions, such as potholes and sudden bumps in the road. The ECU 505 is configured for receiving signals from a plurality of input sensors, such as a gravity sensor 510, a steering angle sensor 515, a speed sensor 520, a tilt sensor 525, and a break sensor 530, to determine not only to which side, but also the angle the driver's seat DS should tilt during a turn, so that the driver remains in control of his/her vehicle. The electronic control system 500 also includes a power source 535, such as a battery, to power the electronic control unit 505, as well as each of the plurality of sensors 510-530.

The gravity sensor 510 is positioned on the frame F of the vehicle V and is configured for determining the literal G-force exerted on the vehicle, such as from either side of the vehicle or from the front or rear of the vehicle so as to record any sudden movements. The steering angle sensor 515 is positioned in close proximity to the steering mechanism SM and is configured for determining the G-force exerted on the vehicle, such as from cornering, a road bump, or a change in the level of the surface. The speed sensor 520 is positioned in communication with the wheels W of the vehicle V and is configured for determining the speed and condition of the vehicle so as to maintain the driver in the correct position in relation to the turn. The tilt sensor 525 is positioned in communicating relation with the driver's seat DS and is configured for determining the angle of the driver's seat DS relative to the turn. The break sensor 530 is positioned in communicating relation with the brake pedals (not shown) and is configured for determining whether the break has been applied so as to activate the solenoid 255, such that the retractable pin 257 is inserted into the opening 247 of the rotatable wheel 240 so as to maintain the driver's seat DS in an up-right, vertical position, such as in a substantially vertical position, as illustrated in FIG. 4A.

Once the input(s), such as the signal(s) from the each sensor 510-530, have been generated, the input(s) is/are transmitted to the ECU 505 to control the motor 202, the damper 210 and the solenoid 255. The inputs from each of the plurality of sensors 510-530 can also be utilized to determine whether to activate a locked vertical indicator light 540, a service indicator light 545, a street/off-road indicator light 550, as well as the malfunction indicator light 555. The ECU 505 uses all the data from the inputs 510-530 to determine not only the direction of the tilt, but also the degree of tilt of the driver's seat DS. Once the direction of the tilt, as well as the degree of the tilt is determined, such as from the sensors 510-530, the information is communicated to the motor 202 so that the motor 200 may activate the gear assembly 220 to rotate the eccentric disc 230 and the rotatable wheel 240. Rotation of the rotatable wheel 240 and the eccentric disc 230 in a given direction, rotates the driver's seat DS attached to the attachment member 249 of the rotatable wheel 240 towards the right or the left, depending on the turn, so that the driver can maintain better control of his/her vehicle V throughout the turn.

In case of a failure of any kind, such as failure of the motor 202 of the vehicle V, the control system 500 will simply turn off the motor 202, such as by transmitting a predetermined shut-off code. The spiral spring mechanism 298 can then work as a back-up so as to return the driver's seat DS and the driver to the upright, vertical position. The damper 210 and the solenoid 255 can then be activated so as to restrict the movement of or stabilize the driver's seat DS and, as such, maintain the driver's seat DS in a vertical position. The solenoid 255 can be activated upon insertion of the retractable pin 257 of the solenoid 255 into the opening 247 of the rotatable wheel 240 until the rollover prevention system 100 is repaired.

It is to be understood that the present invention is not limited to the embodiments described above, but encompasses any and all embodiments within the scope of the following claims.

I claim:

1. A rollover prevention system, comprising:
   a motor having a drive shaft;
   a gear assembly positioned in communicating relation with the motor, the gear assembly including:
     a drive gear,
     a reduction gear positioned in communicating relation with the drive gear, the reduction gear being positioned on the drive shaft of the motor,
     a drive pin attached to the drive shaft of the motor, the drive pin having a gear,
     a rotatable wheel having an interior surface including a geared path and a guide path, an exterior surface including an attachment member mounted onto the exterior surface of the rotatable wheel, the attachment member configured for attachment to a driver's seat, and an opening, the gear positioned on the drive pin being positioned on the geared path of the rotatable wheel; and
     an eccentric disc positioned within the guide path of the rotatable wheel;
   an assembly box configured for housing the gear assembly; and
   an electronic control system having a plurality of sensors, the electronic control system configured for controlling the rotation of the drive shaft of the rollover prevention system.

2. The roll over prevention system according to claim 1, further comprising a solenoid having a retractable pin, the retractable pin being positioned in communicating relation with the opening of the rotatable wheel, the retractable pin configured for locking the rotatable wheel.

3. The roll over prevention system according to claim 1, further comprising a damper having a shaft, the shaft being positioned in communicating relation with the gear assembly.

4. The roll over prevention system according to claim 1, wherein the gear assembly further comprises:
   a chain gear system having a plurality of gears; and
   a spiral spring system positioned in communicating relation with the chain gear system.

5. The roll over prevention system according to claim 4, wherein the spiral spring system includes a plurality of springs.

6. The roll over prevention system according to claim 1, wherein the plurality of sensors includes at least one of a gravity sensor, a steering angle sensor, a speed sensor, a tilt sensor, and a break sensor.

7. The roll over prevention system according to claim 1, wherein the eccentric disc comprises:
 a machine surface;
 a plurality of apertures extending through the machine surface, the apertures configured for lowering the mass of the eccentric disc; and
 a groove for receiving the drive pin.

8. The roll over prevention system according to claim 1, wherein the assembly box comprises:
 a reduction gear case configured for housing the drive gear and the reduction gear;
 an eccentric case configured for housing the rotatable wheel, the eccentric case being positioned adjacent to the reduction gear case; and
 an outer cover member positioned adjacent to the eccentric case.

9. The roll over prevention system according to claim 8, wherein the assembly box further includes an outer disc positioned in between the eccentric case and the outer cover member.

10. The roll over prevention system according to claim 8, wherein the assembly box further includes a protective plate slidably positioned within the eccentric case to protect the eccentric disc and the rotatable wheel.

11. The roll over prevention system according to claim 10, wherein the sealing plate includes an opening through which the attachment member extends.

12. A vehicle with rollover prevention system, comprising:
 a main frame;
 a suspension system attached to the main frame;
 a steering mechanism pivotally attached to the main frame;
 a driver's seat;
 a rollover prevention system secured to the main frame, the rollover prevention system including:
  a motor having a drive shaft;
  a gear assembly positioned in communicating relation with the motor, the gear assembly including:
   a drive gear,
   a reduction gear positioned in communicating relation with the drive gear, the reduction gear being positioned on the drive shaft of the motor,
   a drive pin attached to the drive shaft of the motor, the drive pin having a gear,
   a rotatable wheel having an interior surface including a geared path and a guide path, an exterior surface including an attachment member mounted onto the exterior surface of the rotatable wheel, the attachment member attached to the driver's seat, and an opening, the gear positioned on the drive pin being positioned on the geared path of the rotatable wheel, and
   an eccentric disc positioned within the guide path of the rotatable wheel;
  an assembly box configured for housing the gear assembly; and
  an electronic control system having a plurality of sensors, the electronic control system configured for controlling the rotation of the drive shaft of the rollover prevention system.

13. The roll over prevention system according to claim 12, wherein the gear assembly further comprises:
 a chain gear system having a plurality of gears; and
 a spiral spring system positioned in communicating relation with the chain gear system.

14. The roll over prevention system according to claim 13, wherein the spiral spring system includes a plurality of springs.

15. The roll over prevention system according to claim 12, wherein the plurality of sensors includes at least one of a gravity sensor, a steering angle sensor, a speed sensor, a tilt sensor, and a break sensor.

16. The roll over prevention system according to claim 12, wherein the eccentric disc comprises:
 a machine side;
 a plurality of apertures configured for lowering the mass of the eccentric disc; and
 a groove configured for receiving the drive pin.

17. The roll over prevention system according to claim 12, wherein the assembly box comprises:
 a reduction gear case configured for housing the drive gear and the reduction gear;
 an eccentric case configure for housing the rotatable wheel, the eccentric case being positioned adjacent to the reduction gear case; and
 an outer cover member positioned adjacent to the eccentric case.

18. The roll over prevention system according to claim 17, wherein the assembly box further includes an outer disc positioned in between the eccentric case and the outer cover member.

19. The roll over prevention system according to claim 17, wherein the assembly box further includes a protective plate moveable positioned within the eccentric case to protect the eccentric disc and the rotatable wheel.

20. The roll over prevention system according to claim 19, wherein the protective plate includes an opening through which the attachment member extends.

\* \* \* \* \*